United States Patent
Bhagavath et al.

[11] Patent Number: 5,940,369
[45] Date of Patent: Aug. 17, 1999

[54] ASYNCHRONOUS TRANSFER MODE AND MEDIA ACCESS PROTOCOL INTEROPERABILITY APPARATUS AND METHOD

[75] Inventors: Vijay K. Bhagavath, Lincroft, N.J.; Curtis A. Siller, Jr., Andover, Mass.

[73] Assignee: Lucent Technologies Inc., Murray Hill, N.J.

[21] Appl. No.: 08/824,934

[22] Filed: Mar. 26, 1997

[51] Int. Cl.[6] ........................................................ H04J 3/22
[52] U.S. Cl. ........................... 370/229; 370/235; 370/253
[58] Field of Search .................................... 370/229, 230, 370/231, 232, 235, 395; 395/200.01, 200.06, 200.11, 200.13, 200.2, 252, 253, 200.54, 200.55, 200.58, 200.59, 200.62, 200.65

[56] References Cited

U.S. PATENT DOCUMENTS

| | | | |
|---|---|---|---|
| 5,432,824 | 7/1995 | Zheng et al. | 370/234 |
| 5,646,943 | 7/1997 | Elwalid | 370/230 |
| 5,706,279 | 1/1998 | Teraslinna | 370/232 |
| 5,719,853 | 2/1998 | Ikeda | 370/229 |
| 5,802,310 | 9/1998 | Rajarman | 370/232 |
| 5,812,527 | 9/1998 | Kline et al. | 370/232 |

*Primary Examiner*—Alpus H. Hsu
*Assistant Examiner*—Steven Nguyen

[57] ABSTRACT

A unique simple and generic ABR-MAC interoperability approach is employed which minimizes the impact of a Host Digital Terminal (HDT) ATM switch ABR connection on individual Information Appliances (IAs present at customer premises) and by employing a suitable MAC protocol to transfer data to an ATM network interface buffer (ATM-NI) located at the HDT. To this end, a unique arrangement is employed to regulate the buffer storage unit status in an ATM-NI. More specifically, the arrangement monitors upstream data traffic from active IA-HDT connections and, additionally, any incipient IA-HDT connections. This is realized by employing dual ATM-NI buffer storage unit threshold values that are selected depending on a particular ATM-NI buffer storage providing the particular information appliance on an active connection with information to allow the information appliance to adjust its transmission unit capacity, namely, a low, i.e., first, threshold value and a high, i.e., second, threshold value. In a particular embodiment, a predetermined parameter (k) is defined to specify a number of frames that have elapsed before a next upstream ATM cell is to be transmitted to the ATM-NI buffer storage unit at the HDT. If the amount of data stored in the ATM-NI buffer storage unit is less than the low threshold value, this implies a normal "uncongested" state of operation of the ATM-NI buffer storage unit. If the amount of data in the ATM-NI buffer storage unit is greater than the low threshold value but less than the high threshold value, regulation of the rate of data being supplied to the ATM-NI buffer storage unit must be performed. If the amount of data stored in the ATM-NI buffer storage unit is greater than the high threshold value, transmission of additional data to it is not allowed.

36 Claims, 2 Drawing Sheets

ASYNCHRONOUS TRANSFER MODE AND MEDIA ACCESS PROTOCOL INTEROPERABILITY APPARATUS AND METHOD

TECHNICAL FIELD

This invention relates to transmission systems and, more particularly, to access networks and high speed data services delivery.

BACKGROUND

An emerging technology is a so-called Available Bit Rate (ABR) Asynchronous Transfer Mode (ATM) service category. There is strong interest in utilizing ABR to transport ATM data traffic in broadband access networks employing a suitable media access protocol. The problem, however, with such arrangements is the need for a generic approach to address the ABR interaction with so-called Media Access Control (MAC) units or protocols regarding interoperability issues.

SUMMARY OF THE INVENTION

Problems and limitations of prior known arrangements are overcome by employing a unique simple and generic ABR-MAC interoperability approach which minimizes the impact of a Host Digital Terminal (HDT) ATM switch ABR connection on individual Information Appliances (IAs present at customer premises) and by employing a suitable MAC protocol to transfer data to an ATM network interface buffer (ATM-NI) located at the HDT. To this end, a unique arrangement is employed to regulate the buffer storage unit status in an ATM-NI. More specifically, the arrangement monitors upstream data traffic from active IA-HDT connections and, additionally, any incipient IA-HDT connections. This is realized by employing dual ATM-NI buffer storage unit threshold values that are selected depending on a particular ATM-NI buffer storage unit capacity, namely, a low, i.e., first, threshold value and a high, i.e., second, threshold value. In a particular embodiment, a predetermined parameter (k) is defined to specify a number of frames that have elapsed before a next upstream ATM cell is to be transmitted to the ATM-NI buffer storage unit at the HDT. If the amount of data stored in the ATM-NI buffer storage unit is less than the low threshold value, this implies a normal "uncongested" state of operation of the ATM-NI buffer storage unit. If the amount of data in the ATM-NI buffer storage unit is greater than the low threshold value but less than the high threshold value, regulation of the rate of data being supplied to the ATM-NI buffer storage unit must be performed. If the amount of data stored in the ATM-NI buffer storage unit is greater than the high threshold value, transmission of additional data to it is not allowed.

A technical advantage of this arrangement and method is that no parameters are required to be passed between the ATM ABR and MAC protocol layers. Additionally, it is not based on any specific MAC protocol used in the IA-HDT transmission link. Moreover, it is capable of functioning over any broadband access network platform, for example, hybrid fiber coaxial and fiber in the loop access, and the like arrangements. Furthermore, it is computationally simple, requires relatively little memory and can be implemented as an imbedded feature within the HDT based MAC protocol.

DETAILED DESCRIPTION

Figure 1:
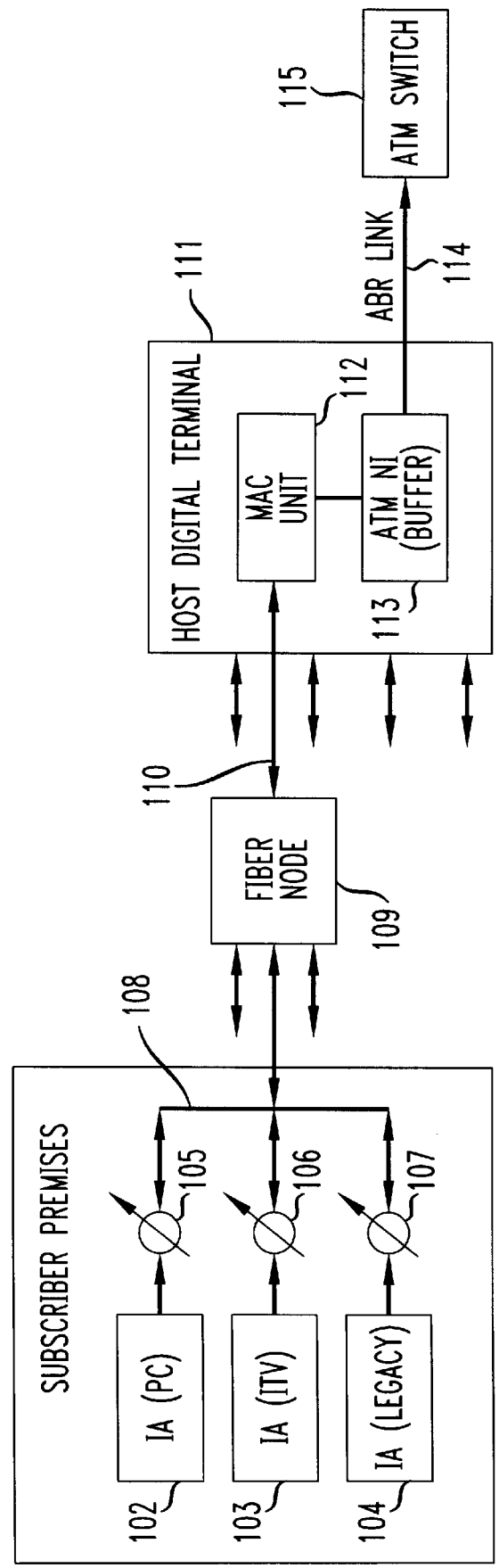
FIG. 1 shows in simplified block diagram form an arrangement in which an embodiment of the invention may be employed.

FIG. 1 shows in simplified block diagram form an arrangement employing an embodiment of the invention. Shown is an example subscriber premises unit 101 including a plurality of information appliances (IAs) and associated transmission regulators. In this example, the IAs include personal computer (PC) 102, interactive television (ITV) unit 103 and legacy unit 104 and associated regulators 105, 106 and 107, respectively. It will be apparent that other multi-media units may also be employed. In this example, a tapped coaxial bus 108 is utilized to connect IAs 102, 103 and 104 and regulators 105, 106 and 107, respectively, to fiber node 109. A single-mode fiber 110 is then employed to connect fiber node 109 to Host Digital Terminal (HDT) 111 and, therein, to Media Access Control (MAC) unit 112. Note that the MAC unit 112 protocol can be any one that supports features of restoration and contention. In this example, MAC unit 112 employs, in one example, the Adaptive Digital Access protocol (ADAPt) to supply received data to ATM-NI buffer storage unit 113. Detailed descriptions of the ADAPt frame structure and operation of the ADAPt MAC protocol are given in "An Adaptive Digital Access Protocol (ADAPt) For Multiservice Broadband Access Networks (Part 1 of 3): Protocol Description," AT&T Contribution to IEEE 802.14 WG, Doc. # IEEE 802.14-95/046, Jun. 28, 1995, "An Adaptive Digital Access Protocol (ADAPt) For Multiservice Broadband Access Networks (Part 2 of 3): Copy of Viewgraphs," AT&T Contribution to IEEE 802.14 WG, Doc. # IEEE 802.14-95/046a-R1, Jun. 28, 1995 and "An Adaptive Digital Access Protocol (ADAPt) For Multiservice Broadband Access Networks (Part 3 of 3):Performance and Capacity Analysis," AT&T Contribution to IEEE 802.14 WG, Doc. # IEEE 802.14-95/046b, Jun. 28, 1995. In turn, the data is supplied under control of our unique ABR-MAC interoperability protocol via ABR link 114 to ATM switch 115. Descriptions of the ATM ABR rate-based flow-control and the ABR service specification are given in "Traffic management specification Ver. 4.0", ATM Forum Technical Committee, 1995 and an article entitled "The rate-based flow control framework for the available bit rate ATM service", IEEE Network, March/April 1995, pages 25–39. Thus, the transmission between the individual IA units 102 through 104 to HDT 111 and therein ATM-NI buffer storage unit 113, in this example, is at the MAC unit 112 layer. Periodic explicit feedback is used from HST 111 to IAs 102 through 104 and associated regulators 105 through 107, respectively, to perform functions of cell-rate-regulation and transmission control for active and so-called incipient IA-HDT connections, respectively. It should be noted that, in this example, the feedback is periodic parsimonious, i.e., sparse, periodic feedback. Regulators 105 through 107 are implemented by busing either the known ATM virtual-scheduling or leaky-bucket algorithms. Additionally, each of regulators 105 through 107 has an external on-off control to temporaily stop upstream transmission of ATM cells in the event of worst case congestion at ATM-NI buffer storage unit 113. It should be noted that the ABR link 114 connection from HDT 111 to ATM switch 115 is at the ATM layer and is specified by a minimum cell transmission rate (MCR) and a peak cell transmission rate (PCR), which are negotiated at the time of setup of the connection. Additionally, feedback control approaches as described in the IEEE Network article, noted above, are employed to regulate the connection between HDT 111 and ABR link 114. The interoperability problem manifests itself at ATM-NI buffer storage unit 113 in HDT 111. An aggregation of ATM cells arriving at HDT 111 from IAs 102 through 104 can potentially overload ATM-NI buffer storage unit 113, because of occasional fluctuations in the ABR link 114 bandwidth between the peak cell rate and the minimum cell rate. Use of our unique interoperability protocol ensures that the fluctuations in the ABR link 114 band width would not affect the IAs 102 through 104, nor cause ATM-NI buffer storage unit 110 to overflow, when the ABR link 114 bandwidth is less than the aggregate cell rate of ATM cells being supplied to HDT 111. The embodiment shown in FIG. 1 and described above is especially useful, in for example, Hybrid Fiber Coaxial (HFC) systems and Subscriber Loop Multiplex systems including digital subscriber line (DSL) technologies, copper loop, fiber in the loop (FITL) or the like.

Figure 2:
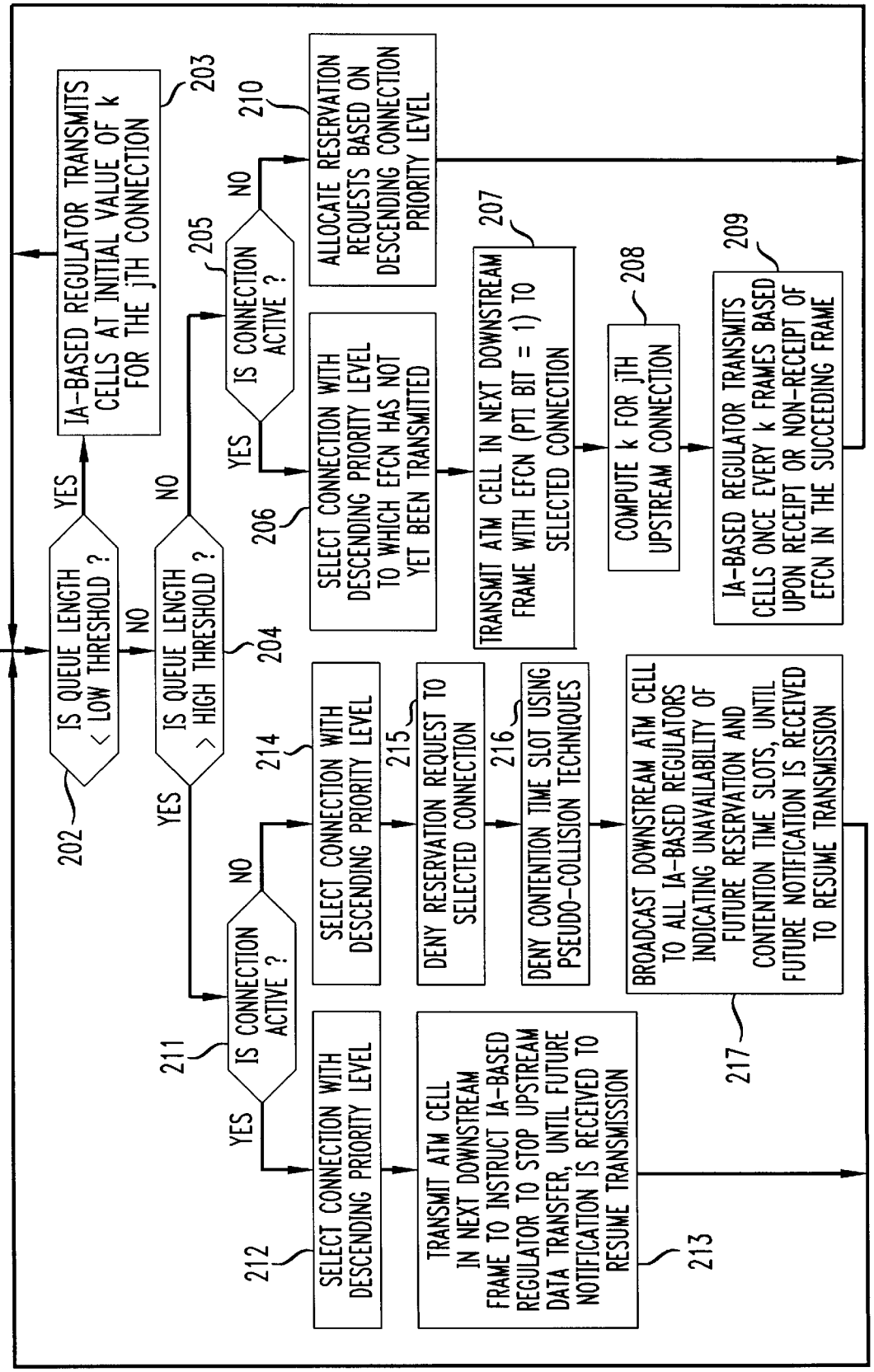
FIG. 2 is a flow chart illustrating the ABR-MAC interoperabilty protocol.

FIG. 2 is a flow chart illustrating the ABR-MAC interoperabilty protocol. The protocol is begun via start step 201. Thereafter, conditional branch point 202 tests to determine if a queue length in ATM-NI buffer storage unit 113 (FIG. 1) is less than the low threshold value. If the test result is YES, step 203 causes the IA-based regulator for the jth connection at an initial "k" rate negotiated with MAC unit 112 (FIG. 1). Note that, in this example, k=1 implies that the IA-based regulator transmits an ATM cell once every upstream frame. A value of k greater than 1 implies that fewer ATM cells are being transmitted since a cell would not be transmitted in each upstream frame. Control is thereafter returned to step 202 to determine whether the queue length is less than the low threshold value. If so, steps 202 and 203 are iterated until step 202 yields a NO test result and control is transferred to conditional branch point 204 which tests to determine if the queue length is greater than the high threshold value. If the test result in step 204 is NO, this corresponds to the situation when the length of the queue in ATM-NI buffer storage unit 113 is between the low and high threshold values. Then, conditional branch point 205 tests to determine whether the connection is active. If the test result in step 205 is YES, the connection is active and control is transferred to step 206. Step 206 causes a connection to be selected with descending priority level to which an explicit forward congestion notification parameter (EFCN) has not yet been transmitted. Step 207 causes an ATM cell in the next downstream frame to be transmitted with EFCN (PTI= 1) to the selected connection. The EFCN parameter is encoded in the payload type indicator (PTI) field of a downstream ATM cell. PTI=1 indicates that EFCN has been received and is interpreted as notification of the presence of congestion at ATM-NI buffer storage unit 113. PTI=−1 indicates that EFCN has not been received and is interpreted as notification of the absence of congestion at ATM-NI buffer storage unit 113. Step 208 causes parameter k to be computed for the selected connection. Parameter k is computed, in this example, in accordance with the pseudocode shown in Table I below. Step 209 causes the IA-regulator for the selected connection to transmit cells once every k frames based on receipt or non-receipt of EFCN in the succeeding frame. Thereafter, control is returned to step 202. Returning to step 205, if the test result is NO, the connection is an incipient connection and control is transferred to step 210. Step 210 causes the allocation of reservation requests to the incipient connections based on descending connection priority level. Thereafter, control is transferred to step 202. Returning to step 204, if the test result is YES, the queue length in ATM-NI buffer storage unit 113 is greater than the high threshold value indicating worst case congestion. Step 211 tests to determine if the connection is active. If the test result in step 211 is YES, the connection is active and step 212 selects the connection with descending priority level. Then, step 213 causes an ATM cell to be transmitted in the next downstream frame to instruct the IA-based regulator associated with the selected connection to stop upstream data transfer until future notification is received to resume transmission. Thereafter, control is returned to step 202. Returning to step 211, if the test result is NO, the connection is incipient and control is transferred to step 214. Step 214 selects a connection with descending priority level. Then, step 215 denies any reservation request to the selected connection. Step 216 denies contention time slot using known pseudo-collision techniques. Finally, step 217 broadcasts a downstream ATM cell to all IA-based regulators indicating the unavailability of future reservation and contention time slots until future notification is received to resume transmission. Thereafter, control is returned to step 202. Once control has been returned to step 202, the protocol proceeds as described above.

TABLE I

Procedure to Determine the Parameter $k_j(t)$

% Pseudocode Listing
Glossary of Parameters
$k_j(t)$ = value of parameter k for connection j at time t
$v_j(t)$ = dummy variable
$d_j(t)$ = time delay between prior update of parameter k for connection j and update at time t
$Q(t)$ = length of HDT-based ATM-NI queue
$Q_t$ = low threshold of queue
$Q_H$ = high threshold of queue
$m_j$ = symmetric scaling factor
$P_j$ = priority of connection j
$u_j(t) \in \{+1,-1\}$
+1 => EFCN received
−1 => no EFCN received
Note: The IA-based regulator transmits one ATM cell every $k^{th}$ upstream frame for connection j %
main ( )
{
    for $(Q(t) < Q_L)$    % while queue length is less than low threshold %
    {
    return;          % Revert control to IA-based regulator when queue is uncongested %
    }
    for $(Q_L \leq Q(t) < Q_H)$    % while queue length is in between low and high threshold %

TABLE I-continued

Procedure to Determine the Parameter $k_j(t)$

```
{
v_j(t) = k_j(t - d_j(t)) + m_j(P_j)u_j(t);  % Equation 1 %
if (v_j(t) < 0)
  {
  k_j(t) = 1;
  }
else
  {
     k_j(t) = v_j(t);
           } }
for (Q(t) ≧ Q_H)    % while queue length is greater than high threshold %
{
k_j(t) = 0;         % Stop cell Tx. when queue length exceeds high threshold %
       } }
```

What is claimed is:

1. A method for use in providing interoperability between Asynchronous Transfer Mode (ATM) Available Bit Rate (ABR) transport and Media Access Control (MAC) unit protocol, a storage unit having queues being associated with the MAC unit, the method comprising the steps of:

determining an amount of data in at least one of the queues assigned to a particular one of one or more information appliances and its associated regulator;

comparing the amount of determined data to at least a first threshold value;

if the amount of determined data is less than said first threshold value, there is no congestion and said regulator associated with said particular information appliance is controlled to regulate transmission of ATM cells from said particular information appliance at a prescribed initial transmission rate;

when the amount of determined data is not less than said first threshold value, comparing the amount of determined data to a second threshold value to detennine the amount of congestion at the storage unit queue;

if the amount of determined data is not greater than said second threshold value, it is determined that there is some congestion, generating a control parameter;

transmitting said control parameter to a regulator associated with a prescribed information appliance for controlling said regulator associated with said prescribed to adjust an ATM cell transmission rate from said prescribed information appliance in accordance with prescribed criteria based on a delay interval between a last prior update and a current update in said transmission rate from said prescribed information appliance;

if the amount of determined data is greater than said second threshold value, it is determined that the congestion at the storage unit queue is too great and said regulator associated with said prescribed information appliance is controlled to inhibit transmission of ATM cells from said prescribed information appliance;

determining if said connection to said particular one of one or more information appliances is active; and selecting a connection to a prescribed information appliance with descending priority level to which an explicit forward congestion notification (EFCN) parameter has not been transmitted.

2. The method as defined in claim 1 wherein said prescribed criteria is further based on the priority of said connection to said prescribed information appliance and further including the step of transmitting said control parameter to said prescribed information appliance on the selected connection.

3. The method as defined in claim 2 wherein said prescribed information appliance on said selected connection, in response to said control parameter, is controlled to transmit ATM cells in ATM frames based on said adjusted ATM transmission rate and depending on whether or not an EFCN parameter was received by said prescribed information appliance on said selected connection in a prior frame.

4. A method for use in providing interoperability between Asynchronous Transfer Mode (ATM) Available Bit Rate (ABR) transport and Media Access Control (MAC) unit protocol, a storage unit having queues being associated with the MAC unit, the method comprising the steps of:

determining an amount of data in at least one of the queues assigned to a particular one of one or more information appliances and its associated regulator;

comparing the amount of determined data to at least a first threshold value;

if the amount of determined data is less than said first threshold value, there is no congestion and said regulator associated with said particular information appliance is controlled to regulate transmission of ATM cells from said particular information appliance at a prescribed initial transmission rate;

when the amount of determined data is not less than said first threshold value, comparing the amount of determined data to a second threshold value to determine the amount of congestion at the storage unit queue;

if the amount of determined data is not greater than said second threshold value, it is determined that there is some congestion, generating a control parameter;

transmitting said control parameter to a regulator associated with a prescribed information appliance for controlling said regulator associated with said prescribed to adjust an ATM cell transmission rate from said prescribed information appliance in accordance with prescribed criteria based on a delay interval between a last prior update and a current update in said transmission rate from said prescribed information appliance;

if the amount of determined data is greater than said second threshold value, it is determined that the congestion at the storage unit queue is too great, and said regulator associated with said prescribed information appliance is controlled to inhibit transmission of ATM cells from said prescribed information appliance;

selecting a connection with a descending priority level; and transmitting an indication to a prescribed information appliance connected by said selected connection thereby causing said prescribed information appliance connected by said selected connection to inhibit transmission of ATM cells.

5. A method for use in providing interoperability between Asynchronous Transfer Mode (ATM) Available Bit Rate (ABR) transport and Media Access Control (MAC) unit protocol, a storage unit having queues being associated with the MAC unit the method comprising the steps of:

determining an amount of data in at least one of the queues assigned to a particular one of one or more information appliances and its associated regulator;

comparing the amount of determined data to at least a first threshold value;

if the amount of determined data is less than said first threshold value, there is no congestion and said regulator associated with said particular information appliance is controlled to regulate transmission of ATM cells from said particular information appliance at a prescribed initial transmission rate;

when the amount of determined data is not less than said first threshold value, comparing the amount of determined data to a second threshold value to determine the amount of congestion at the storage unit queue;

if the amount of determined data is not greater than said second threshold value, it is determined that there is some congestion, generating a control parameter;

transmitting said control parameter to a regulator associated with a prescribed information appliance for controlling said regulator associated with said prescribed to adjust an ATM cell transmission rate from said prescribed information appliance in accordance with prescribed criteria based on a delay interval between a last prior update and a current update in said transmission rate from said prescribed information appliance; if the amount of determined data is greater than said second threshold value, it is determined that the congestion at the storage unit queue is too great, and said regulator associated with said prescribed information appliance is controlled to inhibit transmission of ATM cells from said prescribed information appliance;

if said determined amount of data is greater than the second threshold value, further including the steps of determining if said connection to said particular one of one or more information appliances is active, and if said connection to said particular one of one or more information appliances is not active, selecting a connection to a prescribed information appliance in accordance with a descending priority level.

6. The method as defined in claim 5, if said connection to said particular one of one or more information appliances is not active, further including the step of denying reservation requests to said selected connection.

7. The method as defined in claim 5, if said connection to said particular one of one or more information appliances is not active, further including the step of denying a contention time slot to said selected connection.

8. The method as defined in claim 7 wherein said contention time slot is denied using pseudo-collision techniques.

9. The method as defined in claim 5, if said connection to said particular one of one or more information appliances is not active, further including the step of broadcast transmitting to all information appliance regulators an indication of unavailability of future reservation and contention time slots until notification is received to resume transmission of ATM cells.

10. A method for use in providing interoperability between Asynchronous Transfer Mode (ATM) Available Bit Rate (ABR) transport and Media Access Control (MAC) unit protocol, a storage unit having queues being associated with the MAC unit, the method comprising the steps of:

determining an amount of data in at least one of the queues assigned to a particular one of one or more information appliances and its associated regulator;

comparing the amount of determined data to at least a first threshold value;

if the amount of determined data is less than said first threshold value, there is no congestion and said regulator associated with said particular information appliance is controlled to regulate transmission of ATM cells from said particular information appliance at a prescribed initial transmission rate;

when the amount of determined data is not less than said first threshold value, comparing the amount of determined data to a second threshold value to determine the amount of congestion at the storage unit queue;

if the amount of determined data is not greater than said second threshold value, it is determined that there is some congestion, generating a control parameter;

transmitting said control parameter to a regulator associated with a prescribed information appliance for controlling said regulator associated with said prescribed to adjust an ATM cell transmission rate from said prescribed information appliance in accordance with prescribed criteria based on a delay interval between a last prior update and a current update in said transmission rate from said prescribed information appliance;

if the amount of determined data is greater than said second threshold value, it is determined that the congestion at the storage unit queue is too great, and said regulator associated with said prescribed information appliance is controlled to inhibit transmission of ATM cells from said prescribed information appliance;

wherein said control parameter specifies a number of frames to elapse before a next ATM cell is to be transmitted from said prescribed information appliance.

11. The method as defined in claim 10 wherein said step of generating said control parameter includes the step of generating said control parameter in accordance with $k=v_j(t)=k_j(t-d_j(t))+m_j(P_j)u_j(t)$, where k is the control parameter, $k_j(t)$ is the value of control parameter k for connection "j" at time "t", $v_j(t)$ is a dummy variable, $d_j(t)$ is the time delay between the last prior update of control parameter k for connection j and the update of control parameter k at time t, $m_j$ is a symmetric scaling factor, $P_j$, is the priority of connection j, $u_j(t) \in \{+1,-1\}$, +1 indicates that an explicit forward congestion notification (EFCN) has been received for connection j and −1 indicates that EFCN has not been received for connection j.

12. The method as defined in claim 11 wherein if the value of $v_j(t)$ is less than one (1), further including the step of setting k=1.

13. A method for use in providing interoperability between Asynchronous Transfer Mode (ATM) Available Bit Rate (ABR) transport and Media Access Control (MAC) unit protocol, a storage unit having queues being associated with the MAC units, the method comprising the steps of:

determining an amount of data in at least one of the queues associated with a particular one of one or more information appliances;

comparing the amount of determined data to a first threshold value;

if the amount of determined data is less than said first threshold value, there is no congestion and said regulator associated with said particular information appliance is controlled to regulate transmission of ATM cells from said particular information appliance at a prescribed initial transmission rate;

when the amount of determined data is not less than said first threshold value, comparing the amount of determined data to a second threshold value to determine if the amount of data is greater than the second threshold value;

if the amount of determined data is not greater than the second threshold value, providing a prescribed information appliance on an active connection with information to allow said prescribed information appliance to adjust its transmission rate in accordance with prescribed criteria based on a delay interval between a last prior update and a current update in said transmission rate from said prescribed information appliance;

if the determined amount of data is greater than the second threshold value, providing said prescribed information appliance on an active connection with information to allow said prescribed information appliance to inhibit transmission of data;

determining if said connection to said particular one of one or more information appliances is active; and selecting a connection with descending priority level to which an explicit forward congestion notification (EFCN) parameter has not been transmitted.

14. The method as defined in claim 13 wherein said prescribed criteria is further based on the priority of a connection to a prescribed information appliance and further including the step of transmitting the generated ATM cell transmission rate to said prescribed information appliance on the selected connection.

15. The method as defined in claim 14 wherein said prescribed information appliance on said selected connection, in response to said transmitted ATM cell transmission rate is controlled to transmit ATM cells in ATM frames based on said transmitted transmission rate and whether or not an EFCN parameter was received by said prescribed information appliance on said selected connection in a prior frame.

16. A method for use in providing interoperability between Asynchronous Transfer Mode (ATM) Available Bit Rate (ABR) transport and Media Access Control (MAC) unit protocol, a storage unit having queues being associated with the MAC units, the method comprising the steps of:

determining an amount of data in at least one of the queues associated with a particular one of one or more information appliances;

comparing the amount of determined data to a first threshold value;

if the amount of determined data is less than said first threshold value, there is no congestion and said regulator associated with said particular information appliance is controlled to regulate transmission of ATM cells from said particular information appliance at a prescribed initial transmission rate;

when the amount of determined data is not less than said first threshold value, comparing the amount of determined data to a second threshold value to determine if the amount of data is greater than the second threshold value;

if the amount of determined data is not greater than the second threshold value, providing a prescribed information appliance on an active connection with information to allow said prescribed information appliance to adjust its transmission rate in accordance with prescribed criteria based on a delay interval between a last prior update and a current update in said transmission rate from said prescribed information appliance;

if the determined amount of data is greater than the second threshold value, providing said prescribed information appliance on an active connection with information to allow said prescribed information appliance to inhibit transmission of data;

wherein the step of providing includes the steps of selecting a connection with a descending priority level, and transmitting to said prescribed information appliance connected by said selected connection information to cause said particular information appliance to inhibit transmission of ATM cells.

17. A method for use in providing interoperability between Asynchronous Transfer Mode (ATM) Available Bit Rate (ABR) transport and Media Access Control (MAC) unit protocol, a storage unit having queues being associated with the MAC units, the method comprising the steps of:

determining an amount of data in at least one of the queues associated with a particular one of one or more information appliances;

comparing the amount of determined data to a first threshold value;

if the amount of determined data is less than said first threshold value, there is no congestion and said regulator associated with said particular information appliance is controlled to regulate transmission of ATM cells from said particular information appliance at a prescribed initial transmission rate;

when the amount of determined data is not less than said first threshold value, comparing the amount of determined data to a second threshold value to determine if the amount of data is greater than the second threshold value;

if the amount of determined data is not greater than the second threshold value, providing a prescribed information appliance on an active connection with information to allow said prescribed information appliance to adjust its transmission rate in accordance with prescribed criteria based on a delay interval between a last prior update and a current update in said transmission rate from said prescribed information appliance;

if the determined amount of data is greater than the second threshold value, providing said prescribed information appliance on an active connection with information to allow said prescribed information appliance to inhibit transmission of data;

if said determined amount of data is greater than the second threshold value, further including the steps of determining if said connection to said particular information appliance is active, and if said connection is not active, selecting a connection with a descending priority level.

18. The method as defined in claim 17, if said connection to said particular information appliance is not active, further including the step of denying reservation requests to said selected connection.

19. The method as defined in claim 17, if said connection to said particular information appliance is not active, further including the step of denying a contention time slot to said selected connection.

20. The method as defined in claim 19 wherein said contention time slot is denied using pseudo-collision techniques.

21. The method as defined in claim 17, if said connection to said particular information appliance is not active, further including the step of broadcast transmitting to all information appliance regulators an indication of unavailability of future reservation and contention time slots until notification is received to resume transmission of ATM cells.

22. A method for use in providing interoperabiliiy between Asynchronous Transfer Mode (ATM) Available Bit Rate (ABR) transport and Media Access Control (MAC) unit protocol, a storage unit having queues being associated with the MAC units, the method comprising the steps of:
    determining an amount of data in at least one of the queues associated with a particular one of one or more information appliances;
    comparing the amount of determined data to a first threshold value;
    if the amount of determined data is less than said first threshold value, there is no congestion and said regulator associated with said particular information appliance is controlled to regulate transmission of ATM cells from said particular information appliance at a prescribed initial transmission rate;
    when the amount of determined data is not less than said first threshold value, comparing the amount of determined data to a second threshold value to determine if the amount of data is greater than the second threshold value;
    if the amount of determined data is not greater than the second threshold value, providing a prescribed information appliance on an active connection with information to allow said prescribed information appliance to adjust its transmission rate in accordance with prescribed criteria based on a delay interval between a last prior update and a current update in said transmission rate from said prescribed information appliance;
    if the determined amount of data is greater than the second threshold value, providing said prescribed information appliance on an active connection with information to allow said prescribed information appliance to inhibit transmission of data;
    wherein said step of providing includes the step of generating a control parameter for controlling transmission of ATM cells from said prescribed information appliance, said control parameter specifying a number of frames to elapse before a next ATM cell is to be transmitted from said prescribed information appliance.

23. The method as defined in claim 22 wherein said step of generating said control parameter includes the step of generating said control parameter in accordance with $k=v_j(t)=k_j(t-d_j(t))+m_j(P_j)u_j(t)$, where k is the control parameter, $k_j(t)$ is the value of control parameter k for connection "j" at time "t", $v_j(t)$ is a dummy variable, $d_j(t)$ is the time delay between the last prior update of control parameter k for connection j and the update of control parameter k at time t, $m_j$ is a symmetric scaling factor, $P_j$ is the priority of connection j, $u_j(t) \in \{+1,-1,\},+1$ indicates that an explicit forward congestion notification (EFCN) has been received for connection j and $-1$ indicates that EFCN has not been received for connection.

24. The method as defined in claim 23 wherein if the value of $v_j(t)$ is less than one (1), further including the step of setting $k=1$.

25. Apparatus for use in providing interoperability between Asynchronous Transfer Mode (ATM) Available Bit Rate (ABR) transport and Media Access Control (MAC) unit protocol a storage unit having queues being associated with the MAC units, the apparatus comprising the steps of:
    means for determining an amount of data in at least one of the queues assigned to a particular one of one or more information appliances and its associated regulator;
    means for comparing the amount of determined data to at least a first threshold value and a second threshold value;
    means for generating a transmission control parameter to be supplied to a prescribed information appliance to control the transmission rate of ATM cells for said prescribed information appliance;
    means responsive to the amount of determined data being less than said first threshold value for setting said control parameter at a prescribed initial transmission rate;
    means responsive to the amount of determined data being not less than said first threshold value and not greater than said second threshold value for generating a value of said control parameter in accordance with prescribed criteria based on a delay interval between a last prior update and a current update in said transmission rate from said prescribed information appliance;
    means responsive to the amount of determined data being greater than said second threshold value for generating an indication to be transmitted to said prescribed information appliance to inhibit transmission of ATM cells from said prescribed information appliance;
    means for determining if said connection to said particular one of one or more information appliances is active; and
    means for selecting a connection with descending priority level to which an explicit forward congestion notification (EFCN) parameter has not been transmitted.

26. The apparatus as defined in claim 25 wherein said prescribed criteria is further based on the priority of said connection to said prescribed information appliance and further including means for transmitting said control parameter to said prescribed information appliance on said selected connection.

27. The apparatus as defined in claim 26 wherein said prescribed information appliance includes means responsive to said control parameter to transmit ATM cells in ATM frames based on said adjusted ATM transmission rate and based on whether or not an EFCN parameter was received by said prescribed information appliance on said selected connection in a prior frame.

28. Apparatus for use in providing interoperability between Asynchronous Transfer Mode (ATM) Available Bit Rate (ABR) transport and Media Access Control (MAC) unit protocol, a storage unit having queues being associated with the MAC units, the apparatus comprising the steps of:
    means for determining an amount of data in at least one of the queues assigned to a particular one of one or more information appliances and its associated regulator;
    means for comparing the amount of determined data to at least a first threshold value and a second threshold value;
    means for generating a transmission control parameter to be supplied to a prescribed information appliance to control the transmission rate of ATM cells for said prescribed information appliance;
    means responsive to the amount of determined data being less than said first threshold value for setting said control parameter at a prescribed initial transmission rate;

means responsive to the amount of determined data being not less than said first threshold value and not greater than said second threshold value for generating a value of said control parameter in accordance with prescribed criteria based on a delay interval between a last prior update and a current update in said transmission rate from said prescribed information appliance;

means responsive to the amount of determined data being greater than said second threshold value for generating an indication to be transmitted to said prescribed information appliance to inhibit transmission of ATM cells from said prescribed information appliance;

means for selecting a connection with a descending priority level and means for transmitting an indication to said prescribed information appliance connected by said selected connection causing said prescribed information appliance to inhibit transmission of ATM cells.

29. Apparatus for use in providing interoperability between Asynchronous Transfer Mode (ATM) Available Bit Rate (ABR) transport and Media Access Control (MAC) unit protocol, a storage unit having queues being associated with the MAC units, the apparatus comprising the steps of:

means for determining an amount of data in at least one of the queues assigned to a particular one of one or more information appliances and its associated regulator;

means for comparing the amount of determined data to at least a first threshold value and a second threshold value;

means for generating a transmission control parameter to be supplied to a prescribed information appliance to control the transmission rate of ATM cells for said prescribed information appliance;

means responsive to the amount of determined data being less than said first threshold value for setting said control parameter at a prescribed initial transmission rate;

means responsive to the amount of determined data being not less than said first threshold value and not greater than said second threshold value for generating a value of said control parameter in accordance with prescribed criteria based on a delay interval between a last prior update and a current update in said transmission rate from said prescribed information appliance;

means responsive to the amount of determined data being greater than said second threshold value for generating an indication to be transmitted to said prescribed information appliance to inhibit transmission of ATM cells from said prescribed information appliance;

means responsive to said determined amount of data being greater than the second threshold value for determining if said connection to said particular information appliance is active; and means responsive to said connection to said particular information appliance being not active for selecting a connection with a descending priority level.

30. The apparatus as defined in claim 29 further including means responsive to said connection to said particular information appliance being not active for denying reservation requests to said selected connection.

31. The apparatus as defined in claim 29 further including means responsive to said connection to said particular information appliance being not active for denying a contention time slot to the selected connection.

32. The apparatus as defined in claim 31 wherein said contention time slot is denied using pseudo-collision techniques.

33. The apparatus as defined in claim 29 further including means responsive to said connection to said particular information appliance being not active broadcast transmitting to all information appliance regulators an indication of unavailability of future reservation and contention time slots until notification is received to resume transmission of ATM cells.

34. Apparatus for use in providing interoperability between Asynchronous Transfer Mode (ATM) Available Bit Rate (ABR) transport and Media Access Control (MAC) unit protocol, a storage unit having queues being associated with the MAC units, the apparatus comprising the steps of:

means for determining an amount of data in at least one of the queues assigned to a particular one of one or more information appliances and its associated regulator;

means for comparing the amount of determined data to at least a first threshold value and a second threshold value;

means for generating a transmission control parameter to be supplied to a prescribed information appliance to control the transmission rate of ATM cells for said prescribed information appliance;

means responsive to the amount of determined data being less than said first threshold value for setting said control parameter at a prescribed initial transmission rate;

means responsive to the amount of determined data being not less than said first threshold value and not greater than said second threshold value for generating a value of said control parameter in accordance with prescribed criteria based on a delay interval between a last prior update and a current update in said transmission rate from said prescribed information appliance;

means responsive to the amount of determined data being greater than said second threshold value for generating an indication to be transmitted to said prescribed information appliance to inhibit transmission of ATM cells from said prescribed information appliance;

wherein said control parameter specifies a number of frames to elapse before a next ATM cell is to be transmitted from said prescribed information appliance.

35. The apparatus as defined in claim 34 wherein said means for generating said control parameter includes means for generating said control parameter in accordance with $k=v_j(t)=k_j(t-d_j(t))+m_j(P_j)u_j(t)$, where k is the control parameter, $k_j(t)$ is the value of control parameter k for connection "j" at time "t", $v_j(t)$ is a dummy variable, $d_j(t)$ is the time delay between the last prior update of control parameter k for connection j and the update of control parameter k at time t, $m_j$ is a symmetric scaling factor, $P_j$ is the priority of connection j, $u_j(t) \in \{+1,-1,\}$, +1 indicates that an explicit forward congestion notification (EFCN) has been received for connection j and −1 indicates that EFCN has not been received for connection j.

36. The apparatus as defined in claim 35 further including means for setting k=1, if the value of $v_j(t)$ is less than one (1).

* * * * *